United States Patent [19]
Hu et al.

[11] Patent Number: 5,343,989
[45] Date of Patent: Sep. 6, 1994

[54] REDUCED WEAR CABLE CARRIER AND PADS

[75] Inventors: Paul Y. Hu; David R. Lyman; D. Kenneth Walston, all of Tucson, Ariz.

[73] Assignee: International Business Machines Corporation, Armonk, N.Y.

[21] Appl. No.: 991,687

[22] Filed: Dec. 16, 1992

[51] Int. Cl.$^5$ ........................ H01B 7/24; H02G 11/00
[52] U.S. Cl. ........................... 191/12 R; 191/12 C; 174/136
[58] Field of Search ........................ 191/12 R, 12 C; 138/110; 174/136

[56] References Cited

U.S. PATENT DOCUMENTS

| 566,064 | 8/1896 | Damon . | |
|---|---|---|---|
| 681,470 | 8/1901 | Wolff . | |
| 2,166,798 | 7/1939 | Cote | 18/59 |
| 3,048,358 | 8/1962 | Raulins et al. | 248/49 |
| 4,068,088 | 1/1978 | Smith | 174/136 |
| 4,420,017 | 12/1983 | Moritz | 191/12 C X |
| 4,445,727 | 5/1984 | Funk | 308/4 |
| 4,801,118 | 1/1989 | Wium | 248/300 |
| 4,862,922 | 9/1989 | Kite III | 138/119 |
| 4,988,838 | 1/1991 | Kirtland | 191/12 C |
| 5,178,247 | 1/1993 | Vagaggini | 191/12 C |

FOREIGN PATENT DOCUMENTS

| 227425 | 3/1959 | Australia | 191/12 C |
|---|---|---|---|
| 0490022 | 6/1992 | European Pat. Off. | 191/12 C |
| 2638154 | 3/1978 | Fed. Rep. of Germany | 174/136 |
| 951478 | 3/1964 | United Kingdom | 191/12 C |

*Primary Examiner*—Michael S. Huppert
*Assistant Examiner*—Scott L. Lowe
*Attorney, Agent, or Firm*—Baker, Maxham, Jester & Meador

[57] ABSTRACT

A cable carrier that slides upon itself is provided with pad and padless surfaces or a stainless steel strip therealong. The cable carrier may be connected to a fast moving robotic trolley and manipulative arm assembly in a storage library containing automated magnetic tape cartridges or optical disk cartridges or magnetic disk cartridges. The pad and padless surfaces are made of dissimilar materials, such as stainless steel and plastic respectively. When the pad and padless surfaces slide across one another, there is a minimum of wear and galling of the surfaces. Several arrangements are employed to quickly modify existing carriers to obtain the benefits of this invention. One type of discrete pad can be easily mounted to the existing carrier with double-sided tape and another type of discrete pad can be easily mounted to the existing carrier with tabs. Further, both type of pads are configured with curves to make a smooth transition of pad-to-padless surface or pad-to-pad surface. Another embodiment of the invention is a pad that consists of a stainless steel strip. The stainless steel strip can be easily attached to the carrier with doublesided tape. Since the strip is stainless steel, there is very little wear or galling as compared to that arising from plastic sliding on plastic.

13 Claims, 7 Drawing Sheets

REDUCED WEAR CABLE CARRIER AND PADS

BACKGROUND OF THE INVENTION

1. Field of the Invention

The invention relates to a flexible cable carrier which undergoes wear when it loops back and slides upon itself and special pads included to reduce associated galling and wear.

2. Discussion of the Related Art

Tape libraries are now quite popular for storing large amounts of data. Because of the largeness of some of these libraries, automation has been employed in the retrieval of information from the tapes or the addition of information thereto. A very efficient automated library now in use uses a remote control apparatus which has a traveling manipulative arm. The magnetic tape cartridges are located along a wall in rows and columns. The remote control apparatus is located on a trolley which rides on a track along the tape-filled wall. An automated host system transmits robotic power and control signals to the trolley and manipulative arm. The host system remotely controls the trolley and manipulative arm to retrieve a selected tape, place it in a tape reading and recording device, and then return it to the library when the desired function is completed. The same can be done with optical and magnetic disc cartridges or other media in lieu of tapes.

The power and control signals are fed to the trolley and manipulative arm via molded ribbon cabling, also known as Flagstaff cable. Ribbon cable is a group of cables which are positioned side by side in a molded flexible sheath. Elongated channel shaped carriers receive edge portions of the ribbon cable and ride in an elongated recess alongside the trolley track to confine the ribbon cable and prevent it from snarling with the rest of the retrieval apparatus. These carriers are normally constructed from plastic, such as polypropylene. One end of the carrier and ribbon cabling is connected to a fixed power and signal source while the other end is connected to the trolley and moves back and forth therewith. Because of this arrangement, the carriers loop back and slide upon themselves upon movement of the trolley. This sliding action takes place along an elongated surface formed inside the loop of the carrier.

Because of the high speed of the trolley and the considerable length of the library, a significant amount of friction occurs when these carriers slide upon themselves. This friction causes substantial wear of the plastic carrier and leads to galling. The galling produces frictional debris that requires a periodic cleanup in order to keep the library functional. The cleanup is tedious because of the many corners, crevices and cavities in the library. In an attempt to reduce wear and galling, the carrier material was changed from polypropylene to polyamide which is more expensive. While there was some reduction in the wear and galling it was not nearly sufficient. The library still became contaminated with debris that might affect recording operation.

SUMMARY OF THE INVENTION

The wear and galling of the remote control tape retrieval apparatus cable carrier has been virtually overcome by constructing the carrier surfaces of two portions of dissimilar materials, such as plastic and metal. In one embodiment this has been accomplished by providing each carrier with metallic pads along the elongate carrier surface that forms inside the loop as the trolley moves back and forth. In a preferred embodiment the main part of the carrier is plastic, such as polypropylene, and the pads are stainless steel. The pads are mounted to the elongate surface of the carrier at spaced intervals so that there are pad and padless surfaces therealong. It is desirable that the spacing be optimized for minimal wear and galling. The spacing can be such that sliding engagement is made substantially only between pad and padless surfaces.

Alternatively, the pads can be spaced over selected lengths of the elongated surface where wear and galling are most prevalent. Several types of pads, which are also novel as an article of manufacture, can be employed. One type of pad is mounted to the elongate surface by an adhesive, such as double-sided tape, and the other is mounted to the elongate surface by tabs. The majority of the sliding action takes place between pad and padless surfaces, resulting in virtually no wear or galling. Occasionally sliding action takes place between the metallic pads, which are of the same material. However, even in this instance there is little wear and galling compared to plastic sliding on plastic.

In another embodiment of the invention the carrier is provided with an elongate flexible strip of metallic material, such as stainless steel. The flexible strip may be mounted to the elongate surface of the carrier by a strip of double-sided tape.

From a practical standpoint this invention has overcome the wear and galling problems of cable carriers for remote control magnetic tape cartridge or optical and magnetic disc cartridge retrieval apparatuses. It should be understood, however, that the invention can be employed for any sliding surfaces of the same material where wear and galling are a problem.

An object of the present invention is to overcome the aforementioned problems associated with sliding surfaces of the same material.

Another object is to provide an elongate element with alternate surfaces of dissimilar materials therealong so that when the surfaces slide with respect to one another wear and galling are minimized.

A further object is to provide an elongate flexible cable carrier which is capable of minimum wear and galling when it loops back and slides upon itself.

Yet another object is to provide an elongate flexible channel-shaped carrier for receiving an elongate edge portion of a ribbon cable and which is capable of minimum wear and galling when the carrier loops back and a surface formed inside the loop engages itself in a sliding relationship at high speed.

Still another object is to provide an improved cable carrier for a remote control retrieval apparatus wherein the carrier has minimal wear and galling when it slides upon itself.

Still a further object is to provide a novel pad that is simple to construct and which can be employed to easily modify an existing cable carrier to minimize wear and galling when the carrier slides upon itself.

These and other objects of the invention will become more readily apparent from the ensuing specification when taken together with the drawings.

DESCRIPTION OF THE PREFERRED EMBODIMENTS

Figure 1:
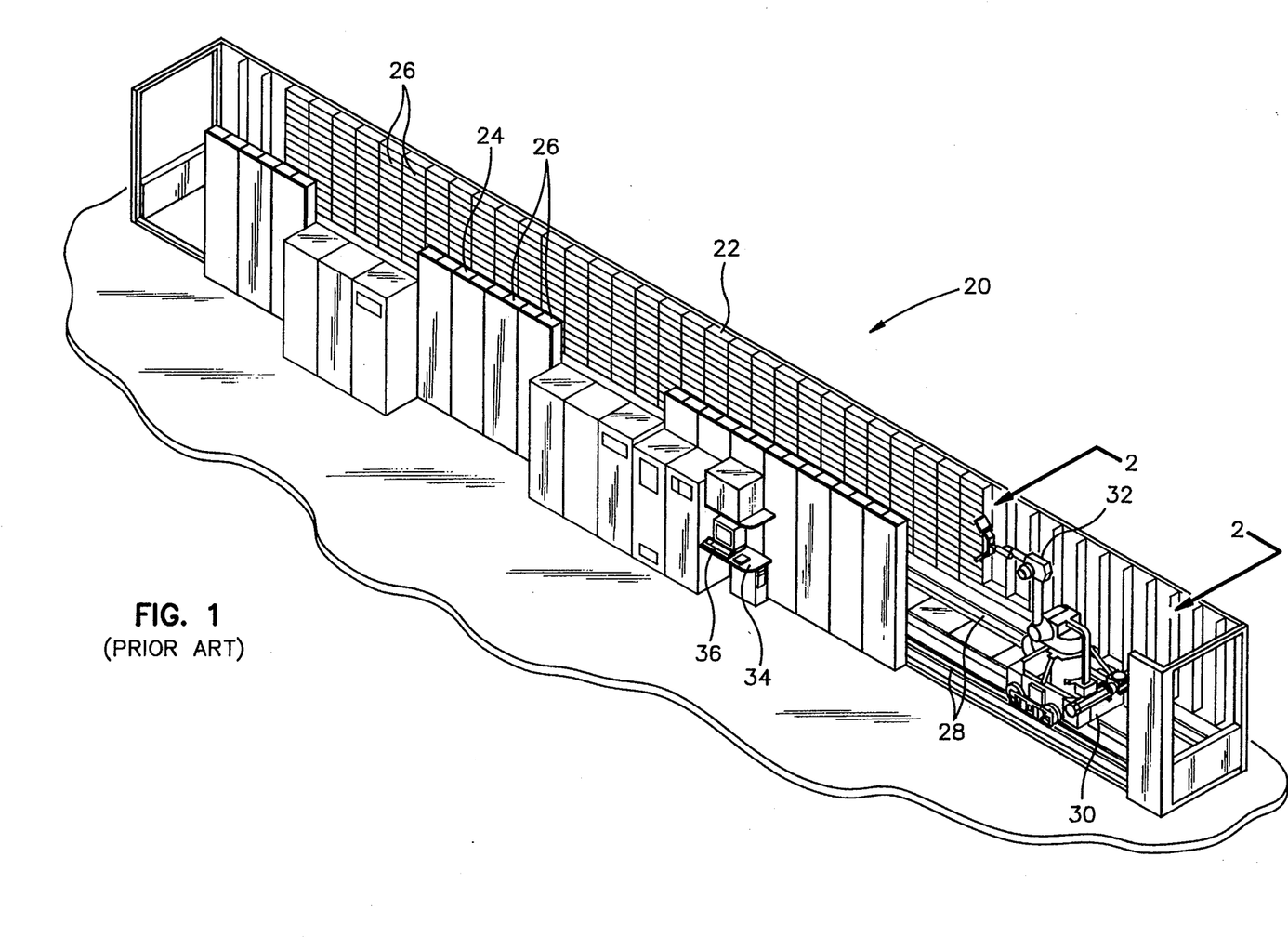
FIG. 1 is an isometric view of a prior art remotely-controlled tape library that employs a robotic manipulative arm on a track and trolley assembly to retrieve and return tapes from and to the library.

Referring now to the drawings where like reference numerals designate like or similar parts throughout the several views, there is shown in FIG. 1 an automated tape library 20 which has oppositely facing walls 22 and 24 of magnetic tape cartridges 26 arranged in rows and columns. Optionally optical and magnetic disk cartridges could be used in lieu of tapes. A track and trolley 28 and 30 are provided with the track 28 extending along the tapes between the walls 22 and 24. A manipulative arm 32 is mounted on the trolley so that it can be positioned adjacent a selected tape for retrieval. A work station is provided at 34 where an operator can sit and operate controls 36 for overall library operation. Controls 36 include a host computer program for controlling the robotic operations, such as moving the trolley and manipulative arm to retrieve or replace the tapes 26.

Figure 2:
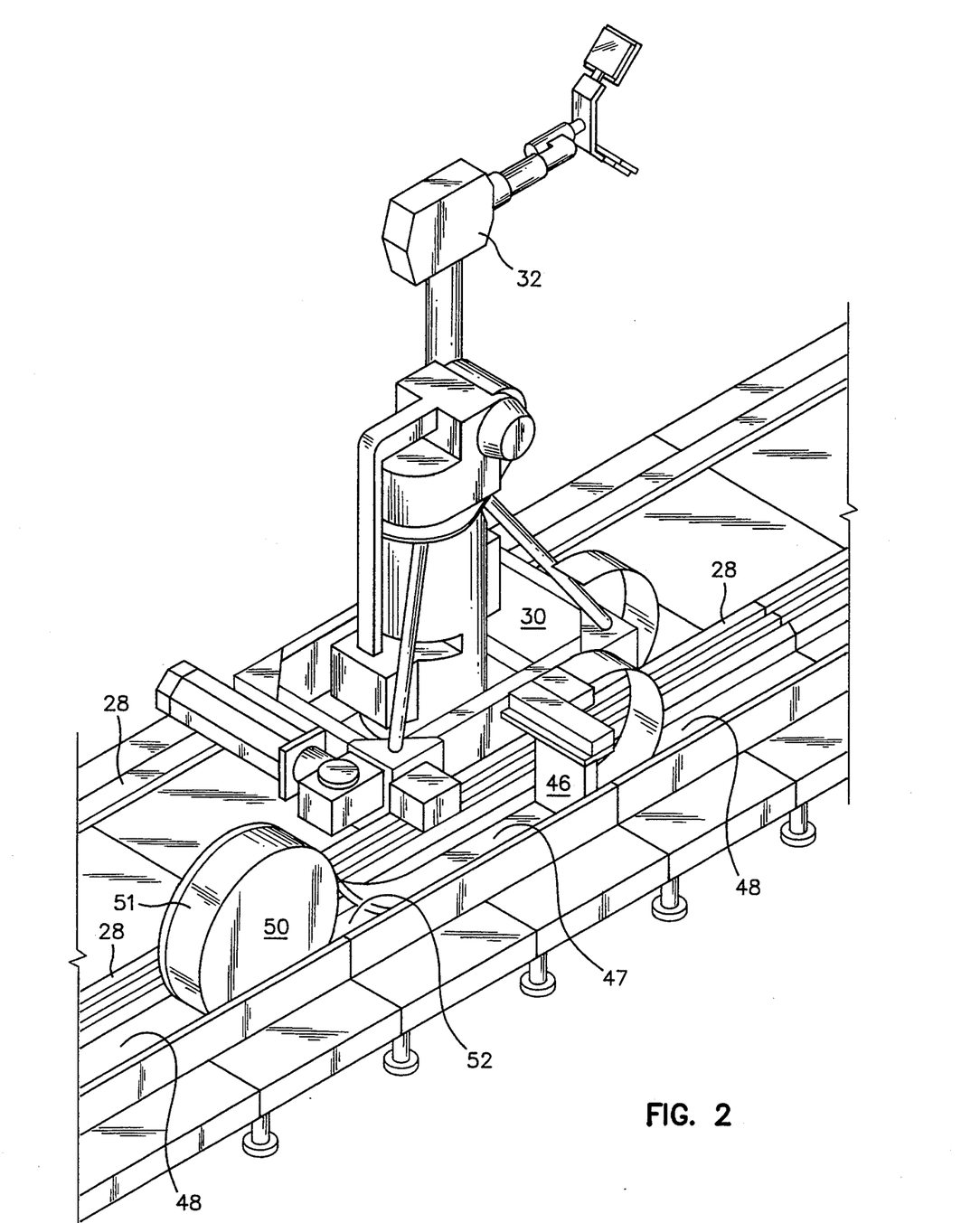
FIG. 2 is an isometric view as seen along plane 2—2 of FIG. 1 with the library walls removed to show the manipulative arm on the trolley and track assembly.
Figures 3, 4:
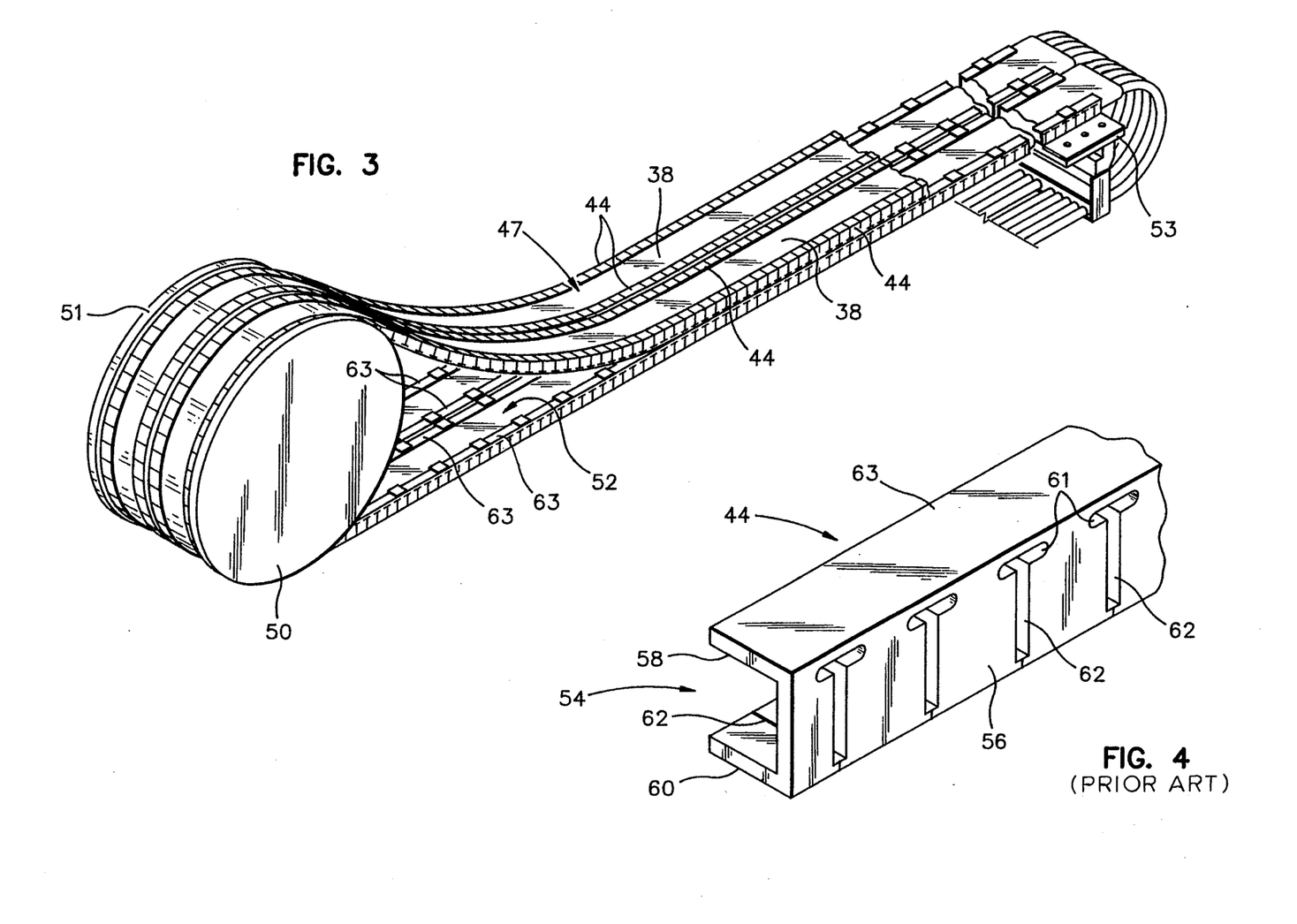
FIG. 3 is an isometric view of a pair of ribbon cables, supporting carriers and a loop-forming hub with the other components of the assembly removed.
FIG. 4 is an isometric view of the prior art ribbon cable carrier without modification by this invention.
Figure 7:
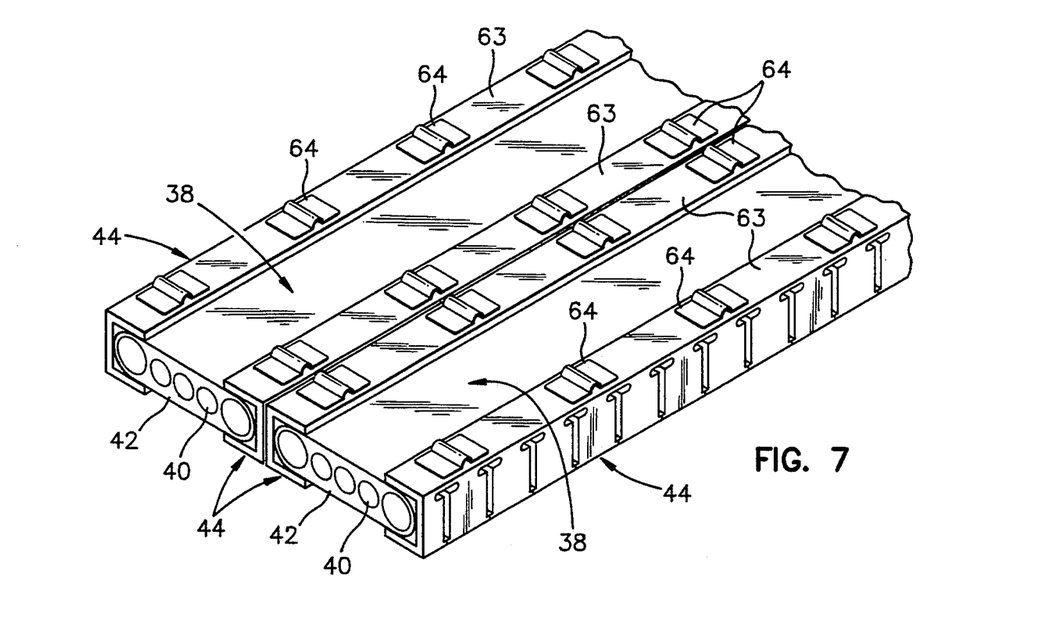
FIG. 7 is an isometric view of a pair of ribbon cables, each being supported by a pair of carriers that have the type of pad shown in FIG. 5.
Figure 10:
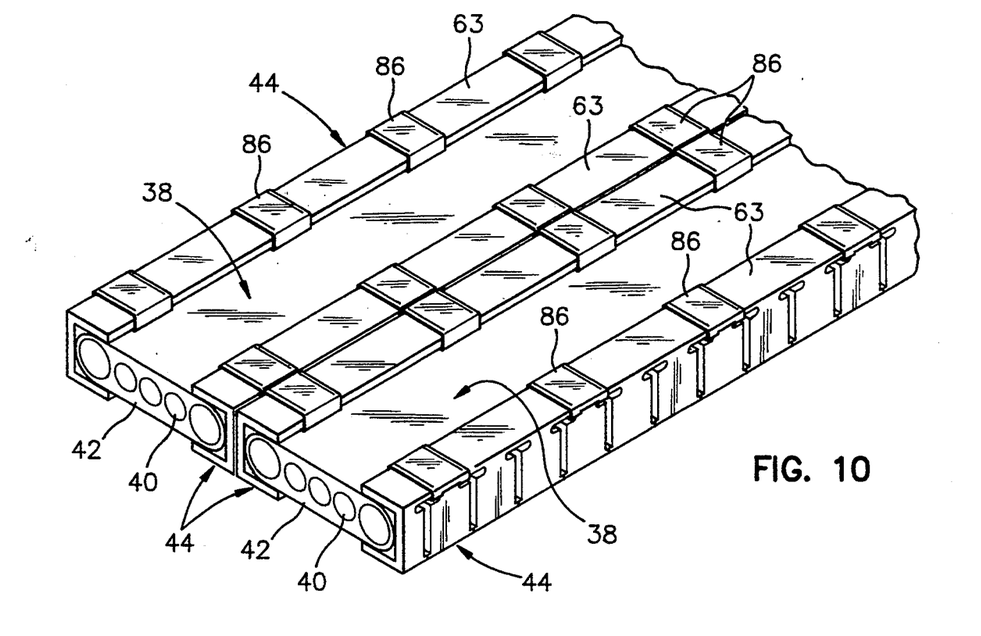
FIG. 10 is an isometric view of a pair of ribbon cables, each being supported by a pair of carriers which have the type of pad shown in FIG. 8.

The controls 36, at the operator's station 34, transmit or allow the transmission of power and control signals to the trolley 30 and manipulative arm 32 via cabling, such as ribbon cables 38, shown in a side by side relationship in FIGS. 3, 7, 10 and ]3. As shown in FIG. 7, for instance, each ribbon cable 38, which is also known as Flagstaff cable, has a group of cables 40 which are fixed in a side by-side-spaced relationship in a molded sheath 42. As shown in FIG. 3, 7, 10 and 13 each ribbon cable 38 is supported by a pair of elongate flexible carriers 44, which keep each ribbon cable in a constrained manner. As shown in FIG. 2, one set of ends of the carriers 44 and ribbon cables 38 are connected by a clamp 46 to the trolley 30 and are movable therewith. From the clamp 46, a top portion 47 of the carriers and the cabling lay in an elongated recess 48 that extends longitudinally alongside the track 28. The carriers and cabling then extend around a hub 50 in a loop 51, the hub freely riding in the elongated recess 48. A bottom portion 52 of the carrier 44 and ribbon cables 38 then extends into the elongated recess 48 below the top portion 47 of the carriers and ribbon cables. As shown in FIG. 3, it is these top and bottom portions 47 and 52 that slide on one another and have a potential of wear and galling. Still referring to FIG. 3, the other end of the carriers and ribbon cabling are fixedly connected, in relationship to the trolley track, by a clamp 53, after which the cables extend from the clamp to a power source (not shown) and the controls 36 at the operators station.

As shown in FIG. 4, the carrier 44 is preferably an elongate channel which has an open side 54, an opposite closed side 56 and leg sides 58 and 60. The closed side 56 has a series of apertures 61 and a slit 62 which extends from each aperture through the closed side 56 and one of the leg sides 60 so that the carrier can bend about the other leg side 58. As shown in FIGS. 2 and 3, this arrangement enables the carrier 44 to easily form the loop 51 about the hub 50 as it makes its transition from a top position 47 to a bottom position 52 or vice versa within the elongated recess 48. The open channel side 54 of each carrier snugly receives an edge portion of a ribbon cable within its elongate cavity. Each carrier may be constructed of polypropylene, which is somewhat flexible. As shown in FIGS. 2 and 3, and as stated hereinabove, the top portion 47 of the carriers and the cabling extends from the clamp 46 to the hub 50, thence around the hub in a loop 5], thence along a bottom portion 52 which is located below the top portion 47. It can be seen that when this occurs each carrier 44 has an inside elongate surface 63, formed by the loop 51, which slides upon itself as the trolley moves toward and away from the fixed clamp end 53. In the prior art this sliding action resulted in considerable wear and galling of the inside elongate surfaces 63 of the carriers 44. This arises from plastic sliding on plastic, the weight of the top cabling and carriers and the fast travel of the trolley as it moves back and forth. The wear is hard on the carriers and the galling requires periodic tedious cleaning of the debris from the interstices of the library.

In one embodiment, the wear and galling problems associated with the prior art cable carrier have been substantially overcome by mounting pads of dissimilar material on the inside elongate surface 63 of the carrier. The carrier is a plastic material, such as polypropylene, and the pad is metal, preferably stainless steel. The pads are selectively spaced from one another along the carrier's inside elongate surface 63 to optimize sliding engagement of the pad surfaces with the padless surfaces. The invention includes several types of pads, each of which can be affixed in a novel manner to the elongate surface 63 of the carrier 44. There is also another embodiment of the invention where a stainless steel strip is mounted to the elongate surface of the carrier in lieu of the pads. All of these embodiments and the various details of the inventions will now be described.

Figures 5, 6:
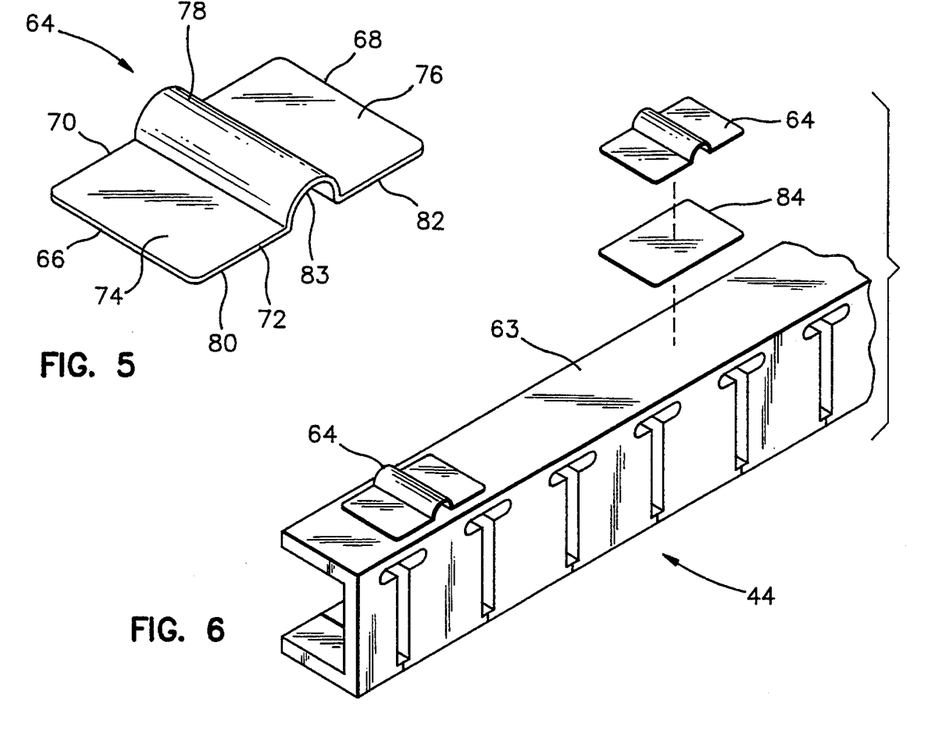
FIG. 5 is an isometric view of one type of pad.
FIG. 6 is an isometric view of a carrier portion with pads of the type shown in FIG. 5, one of the pads and double-sided tape being shown in an exploded view with respect to the rest of the carrier.

One type of pad 64 and its mounting are illustrated in FIGS. 5, 6 and 7. This pad, which is shown in detail in FIG. 5, may be substantially rectangular with forward and rearward edges 66 and 68 with respect to the longitudinal axis of the inside elongate surface 63 of the carrier 44 and has oppositely located side edges 70 and 72. The pad has a top slidable surface which has forward and rearward substantially flat portions 74 and 76 with a raised portion 78 therebetween. The raised portion is preferably an elongate uniformly-shaped arcuate bump that extends laterally between the side edges 70 and 72 and which is substantially centered between the forward and rearward edges 66 and 68, with the arc of the bump being preferably less than 180 degrees so as to provide for smooth sliding transitions between the pad and padless surfaces. The pad has a bottom with forward and rearward flat portions 80 and 82, with respect to an elongate indentation 83 opposite the bump 78. As will be explained hereinafter, the flatness of the bottom of this pad serves an important purpose of this invention.

In FIG. 6, there is shown one of the pads 64 being fixedly mounted to the inside elongate surface 63 of the carrier 44. As shown in FIG. 7, the spacing provides pad and padless surfaces along the inside elongate surface 63. FIG. 7 also shows the invention being used to constrain a pair of ribbon cables 38. An edge portion of each ribbon cable is snugly recessed within a respective channel 44. As shown in FIGS. 2 and 3, this allows the channels 44 with their constrained ribbon cables 38 to follow around the hub 50 and in and out of the elongated recess 48 in an organized manner. As shown in FIG. 6, the preferred attachment of the pad 64 to the elongate surface 63 of the channel is by double-sided tape 84. Because of the flatness of the elongate surface 63 and the flatness of the bottom of the pad 64, a strong mounting can be achieved. Another advantage of the double-sided tape is that existing channels can be quickly converted to include the features of the invention.

Figures 8, 9:
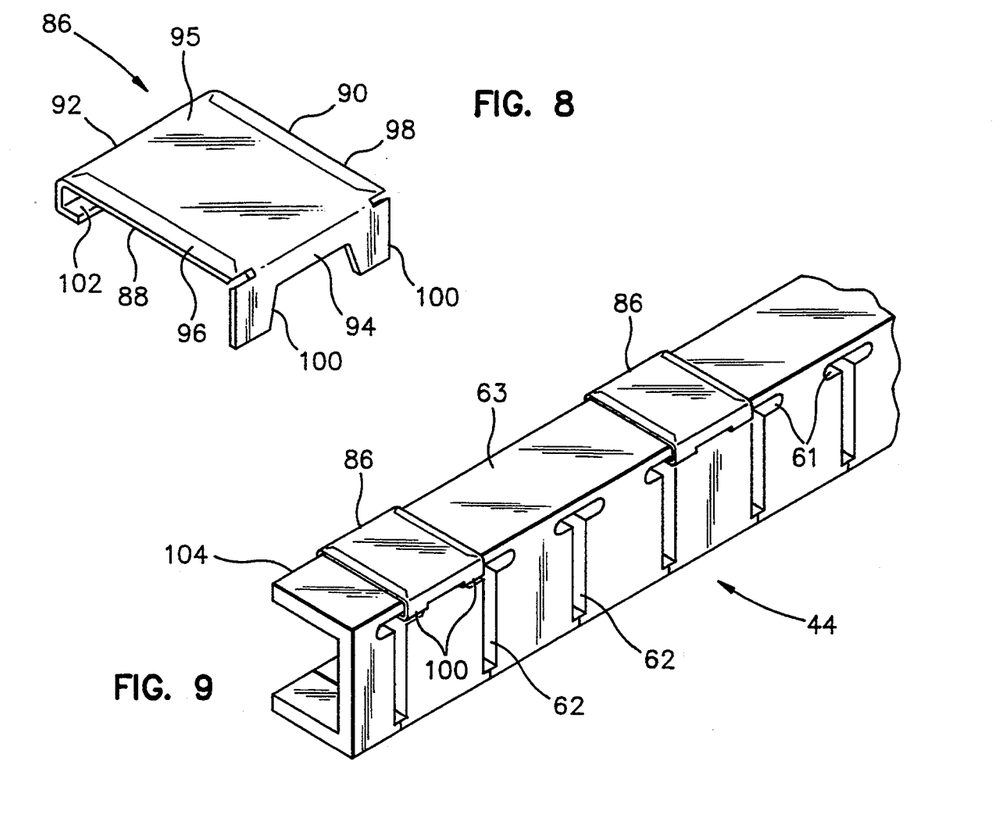
FIG. 8 is an isometric view of another type of pad.
FIG. 9 is an isometric view of a carrier portion with pads of the type shown in FIG. 8, these pads being clipped into place on the carrier.

Another pad 86 is illustrated in FIGS. 8, 9 and 10. This pad has forward and rearward edges 88 and 90, with respect to the longitudinal axis of the inside elongate surface 63 of the carrier 44, and has opposite side edges 92 and 94 interconnected with and located between the forward and rearward edges 88 and 90. This pad has a raised flat portion 95 that provides a slidable surface. The raised flat portion 95 extends across substantially the entire top of the pad to all edges. The elevation of the raised portion takes place along forward and rearward curves 96 and 98, which gradually raise and lower the pad and padless surfaces during sliding engagement of the elongate surface 63 upon itself. As shown in FIG. 8, the pad 86 is provided with tab means along both side edges. The tab means for the side edge 94 may be a pair of spaced-apart tabs 100 and the tab means for the side edge 92 may be an elongate tab 102 that extends substantially along the entire edge 92.

The mounting of the tab means to the carrier's elongate surface 63 is shown in FIG. 9. The elongate tab 102 may be preformed in a U-shape or bent around the channel edge 104 upon installation, and the pair of tabs 100 may be bent into the channel apertures 61. This pad 86 can be quickly mounted to convert existing channels to gain the benefit of this invention. In FIG. 10, the latter described pads are employed in a two-ribbon cable embodiment having two pairs of channels 44 for constraining the ribbon cables 38.

Figures 11, 12:
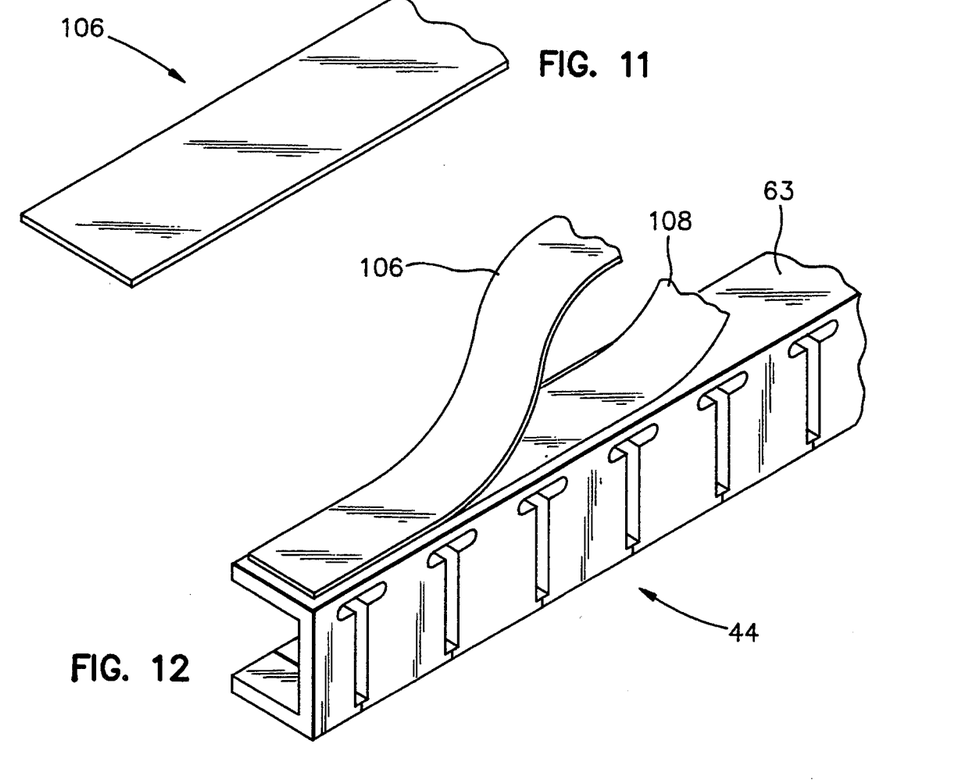
FIG. 11 is an isometric view of a flexible metallic strip employed as a second embodiment of this invention.
FIG. 12 is an isometric view of a portion of a carrier with the flexible metallic strip being mounted thereon by a strip of double-sided tape, a portion of the metallic and double-sided strips being broken away from the carrier.
Figure 13:
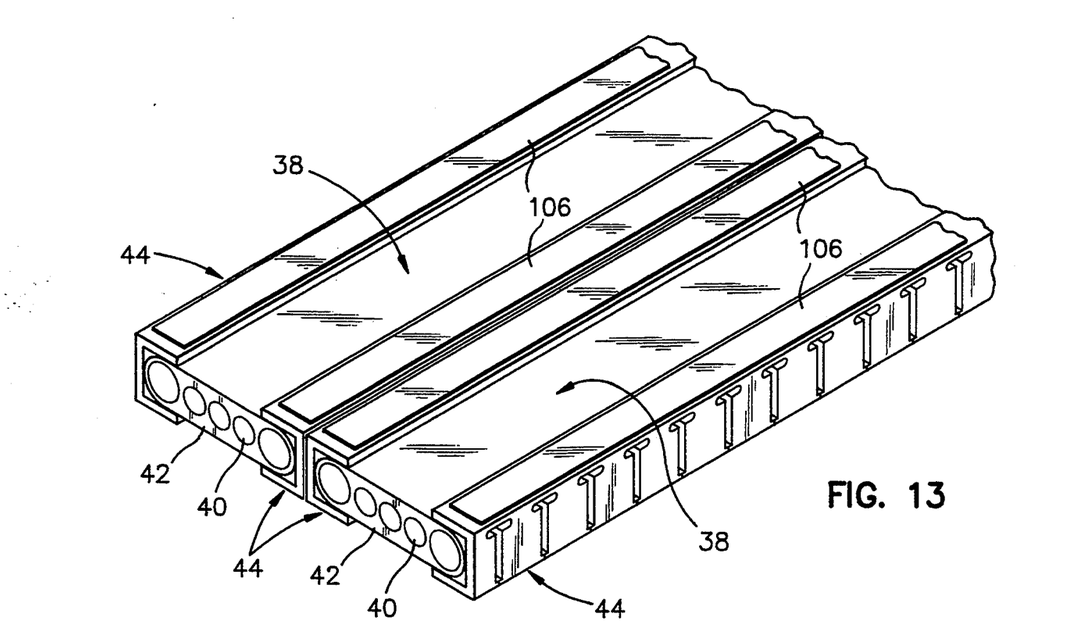
FIG. 13 is an isometric view of a pair of ribbon cables, each being supported by a pair of carriers which have the flexible metallic strip of FIG. 11 mounted thereon.

Another embodiment of this invention is illustrated in FIGS. 11, 12 and 13. Here an elongate flexible strip of stainless steel 106 is attached parallel to substantially the entire inside elongate surface 63 of the carrier 44. As shown in FIG. 12, the stainless steel strip is mounted to the inside elongate surface 63 of the carrier by a strip of double-sided tape 108. Since stainless steel will be sliding on stainless steel during movement of the trolley 30, there is relatively little wear and galling. Existing cable carriers can be easily modified by this embodiment to obtain the advantages of this invention.

Figures 14, 15:
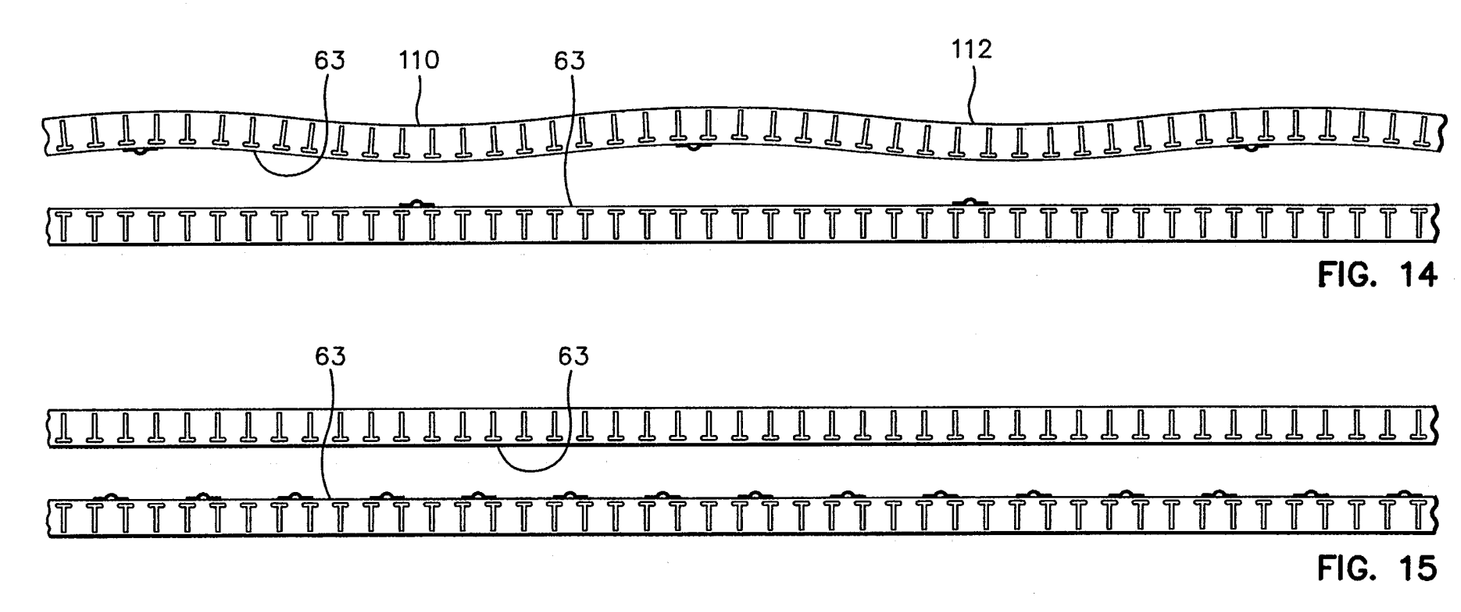
FIG. 14 is a schematic illustration of carrier portions spaced apart from their normal sliding engagement to show one embodiment of the spacing for either type of pad.
FIG. 15 is a schematic illustration of carrier portions spaced apart from their normal sliding engagement to show another embodiment of the spacing for either type of pad.

FIGS. 14 and 15 schematically show carrier portions spaced apart from their normal sliding engagement to illustrate several types of spacing arrangements for either type of pad. In FIG. 14 the pads are arranged on the carrier's inside elongate surface 63 so that there is substantially only pad-to-padless and pad-to-pad surface engagement when the inside elongate surface 63 slides upon itself. The spacing of the pads will depend upon the flexibility of the carrier or carriers. When a pad on the top carrier portion slides upon a bottom padless carrier portion the top portion is uplifted for a distance because of the height of the pad. But because of the flexibility of the carrier it commences to drop, as shown at 110 and 112, and will engage the bottom carrier portion without the next pad in place. It is at this location that another pad is placed on the bottom portion so that padless surfaces engage only pad surfaces. Further, since most embodiments of the carriers are fixed in their travel the spacing from top pad surface to the next bottom pad surface to the next top pad surface and so on is preferably equidistant. With this arrangement, pad surfaces will occasionally engage pad surfaces. Since these pad surfaces are stainless steel there are no significant problems of wear and galling.

Another arrangement for the placement of the pads is illustrated in FIG. 15. In this embodiment the pads are placed in a spaced apart relationship along selected lengths of the inside elongate surface 63 of the carrier. The lengths are those portions where the potential for wear is the greatest, such as the initial surface engagement of the elongate surface and/or locations of library tapes that are most often accessed.

Figure 16:
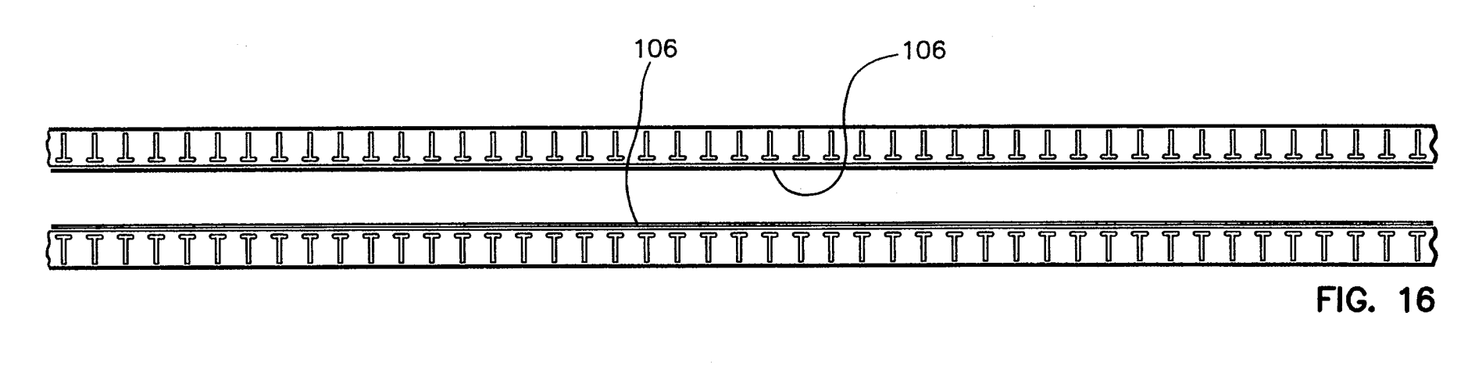
FIG. 16 is a schematic illustration of carrier portions spaced apart from their normal sliding engagement to show the mounting of the flexible metallic strip of FIG. 11.

FIG. 16 schematically shows the carrier spaced apart from its normal sliding engagement to show the stainless steel strip 106, which is mounted along both the top and bottom sliding portions of the carrier 44. In this instance the stainless steel strip slides upon itself.

Operation of the Invention

The existing prior art carriers for ribbon cables can be easily modified to obtain the benefits of this invention. The pad 64 in FIG. 5 can be easily mounted to the inside elongate surface 63 of the carrier 44 at selected locations by simply pressing them on with double-sided tape 84. Likewise, the pad 86 in FIG. 8 can be placed by simply bending several tabs into place about the carrier. Further, the stainless steel strip 106 in FIG. 11 can be easily affixed to the elongate surface 63 of the carrier 44 by the strip of double-sided tape 108. With the pads or stainless steel strip properly placed, there will be minimum wear and galling when the inside elongate surface 63 of the carrier or carriers 44 formed inside the loop 51 slides upon itself. This will virtually eliminate periodic shutdowns of the library for removal of debris created by galling in plastic sliding upon plastic.

It should be understood that this invention can be utilized for any type of belt-like plastic carrier that slides on itself. The important idea is that the pad means (plurality of pads or one elongate pad) be constructed of metal, preferably stainless steel, and that they be properly placed. Further, the rectangular-type pads are novel as an article of manufacture. Both of these pads can be stamped out of thin sheet metal. One of these pads is unique because it performs the desired reduced wear function by simply attached it to the inside elongate surface of an existing plastic carrier with double-sided tape. Also, the other pad is unique for the particular configuration of the carrier described hereinabove.

Obviously many modifications and variations are possible in light of the above teachings. It is therefore to be understood that within the scope of the appended claims that the invention may be practiced otherwise than as specifically described.

We claim:

1. A combination comprising:
an elongate plastic carrier which has a pair of ends and which is capable of looping back on itself between its ends to form a loop;
the elongate plastic carrier having an inside elongate plastic surface which forms an inside of the loop and which extends therebeyond for sliding action upon itself when one end of the carrier is moved longitudinally;
a plurality of metallic pads; and
means mounting the pads along the inside elongate plastic surface of the carrier in a spaced relationship for sliding action between the metallic pads and the inside elongate plastic surface when said one end of the carrier is moved longitudinally,
whereby, upon the inside elongate surface of the carrier sliding upon itself, plastic to plastic sliding engagement is minimized.

2. The combination as claimed in claim 1 including:
each pad having forward and rearward edges with respect to a longitudinal axis of the carrier, opposite side edges therebetween, and a top slidable surface;
the top slidable surface of the pad having a raised portion between the forward and rearward edges; and
the raised portion extending substantially entirely across the pad laterally from side edge to side edge.

3. In a remote control retrieval apparatus which has a track and trolley assembly, the trolley having a manipulative arm for article retrieval and placement, the trolley and manipulative arm being powered by a plurality of cables to a fixed power source with one set of cable ends connected to the trolley and movable therewith while the other set of cable ends is connected to the power source and remains stationary, the cables being disposed within at least one flexible plastic belt-like cable carrier which has an inside elongate plastic surface which loops back and slides upon itself as the trolley moves along the track, the loop relationship and the length of surface engagement increasing as the trolley moves toward the power source and the loop relationship and the length of surface engagement decreasing as the trolley moves away from the power source, the improvement comprising:
a plurality of metallic pads;
means mounting the metallic pads on the inside elongate plastic surface of the carrier at spaced intervals so that the inside elongate plastic surface has metallic pad and plastic padless surfaces therealong so that, upon movement of the trolley, at least a portion of the slidable engagement takes place between the metallic pad and plastic padless surfaces of the inside elongate plastic surface,
whereby, upon the inside elongate surface of the carrier sliding upon itself, plastic to plastic sliding engagement is reduced.

4. The improvement as claimed in claim 3 including:
each pad having forward and rearward edges with respect to a longitudinal axis of the inside elongate surface, opposite side edges therebetween, and a top slidable surface;
the top slidable surface of the pad having a raised portion between the forward and rearward edges;
the raised portion extending substantially entirely across the pad laterally from side edge to side edge; and
the elevation of the raised portion from the forward and rearward edges taking place along forward and rearward curves which gradually raise and lower respectively the pad and padless surfaces during sliding engagement of the inside elongate surface of the carrier upon itself.

5. The improvement as claimed in claim 4 including:
the forward and rearward curve portions being joined in a continuous curved relationship to form an upwardly projecting elongate bump which curves less than 180 degrees;
each pad having a bottom which has forward and rearward flat portions with respect to the bump; and
the mounting means being double-sided tape for adhering the bottom flat portions of the pads to the inside elongate surface of the carrier.

6. A cable carrier comprising:
an elongate plastic element which is capable of retaining ribbon cable means;
the elongate plastic element having a pair of ends and being capable of looping back on itself to form a loop;
the elongate plastic element having an inside plastic surface which forms an inside of the loop and which extends therebeyond for sliding action upon itself when one end of the element is moved longitudinally;
a plurality of stainless steel pads;
means for mounting the stainless steel pads at spaced intervals along the inside elongate plastic surface of the elongate plastic element so as to provide stainless steel pad and plastic padless surfaces therealong so that a portion of the sliding surface engagement is between stainless steel pads and plastic padless surfaces;
whereby, upon movement of the elongate plastic element, plastic to plastic sliding engagement of the inside elongate surface is minimized.

7. A remote control retrieval apparatus including the cable carrier of claim 6, the remote control retrieval apparatus comprising:

a stationary track and a movable trolley assembly, the trolley carrying a manipulative arm for article retrieval and placement;

the trolley and manipulative arm being powered via a plurality of ribbon cables which have one set of cable ends which are connected to the trolley and are movable therewith and another set of cable ends which are connected to a fixed power source; and the ribbon cables being said ribbon cable means and being retained by a plurality of cable carriers.

8. A cable carrier comprising:

a movable elongate flexible plastic channel which has an open elongate cavity for receiving and retaining at least a portion of the width of ribbon cable means, a side portion opposite the open elongate cavity and a pair of channel legs;

the elongate flexible plastic channel being capable of looping back and having an elongate plastic surface which makes the loop and then slides on itself upon movement of the channel;

a plurality of stainless steel pads;

means for mounting the stainless steel pads at spaced intervals along the elongate plastic surface of the elongate flexible plastic channel so as to provide stainless steel pad surfaces and plastic padless surfaces therealong, each channel leg having an interior side and an exterior side with respect to the open elongate cavity of the channel;

said elongate plastic surface being along the exterior side of one of the channel legs;

the channel having spaced openings in its side portion;

each pad being substantially rectangular with forward and rearward edges with respect to a longitudinal axis of the elongate plastic surface and interconnected with oppositely located side edges;

each pad having a top flat portion which is raised above the edges, the top flat portion making up the majority of the top of the pad;

tab means connected to the side edges of each pad for attaching the pad to said elongate plastic surface of said one of the channel legs;

the tab means at one side edge of each pad being a pair of spaced-apart tabs which enter the spaced openings of the side portion of the channel for retaining the pad thereto; and the tab means of the other side edge of each pad being an elongate tab which receives an open edge of the elongate plastic surface of said one of the channel legs for retaining the pad to the carrier.

9. A remote control retrieval apparatus including the cable carrier of claim 8, the remote control retrieval apparatus comprising:

a stationary track and a movable trolley assembly, the trolley carrying a manipulative arm for article retrieval and placement;

the trolley and manipulative arm being powered via a plurality of ribbon cables which have one set of cable ends which are connected to the trolley and are movable therewith and another set of cable ends which are connected to a fixed power source; and the ribbon cables being said ribbon cable means and being retained by a plurality of cable carriers.

10. A cable carrier comprising:

a movable elongate flexible plastic element which is capable of retaining ribbon cable means;

the elongate flexible plastic element being capable of looping back and having an elongate plastic surface which makes the loop and then slides on itself upon movement of the element;

a plurality of stainless steel pads;

means for mounting the stainless steel pads at spaced intervals along the elongate plastic surface of the elongate flexible plastic element so as to provide stainless steel pad surfaces and plastic padless surfaces therealong, each pad being substantially rectangular with forward and rearward edges with respect to a longitudinal axis of the elongate plastic surface and interconnected with oppositely located side edges;

each pad having a top slidable surface which has forward and rearward substantially flat portions with a raised portion therebetween; and the raised portion being an elongated uniformly shaped arcuate bump which extends laterally between the side edges and is substantially centered between the forward and rearward edges with the arc of the bump being less than 180 degrees.

11. A cable carrier as claimed in claim 10 including:

each pad having a bottom which has forward and rearward flat portions with respect to the bump; and the mounting means being double-sided tape for adhering the bottom flat portions of the pads to the elongate plastic surface of the channel.

12. A cable carrier as claimed in claim 11 including:

the pads being mounted in spaced intervals along the elongate plastic surface so that there is substantially only pad-to-padless and pad-to-pad surface engagement when the elongate plastic surface slides upon itself.

13. A remote control retrieval apparatus including the cable carrier of claim 12, the remote control retrieval apparatus comprising:

a stationary track and a movable trolley assembly, the trolley carrying a manipulative arm for article retrieval and placement;

the trolley and manipulative arm being powered via a plurality of ribbon cables which have one set of cable ends which are connected to the trolley and are movable therewith and another set of cable ends which are connected to a fixed power source; and the ribbon cables being said ribbon cable means and being retained by a plurality of cable carriers.

* * * * *